F. O. HILFIKER.
FAUCET ATTACHMENT.
APPLICATION FILED JUNE 17, 1911.
1,112,065.
Patented Sept. 29, 1914.
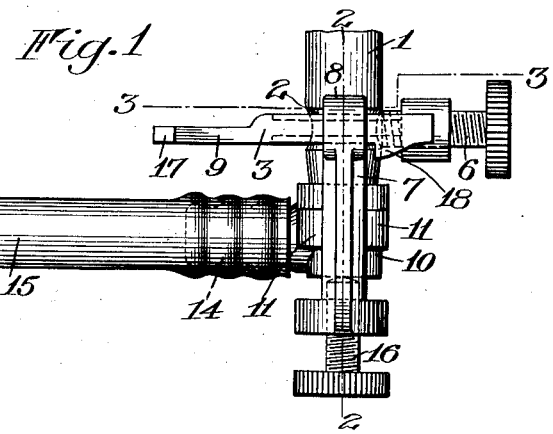
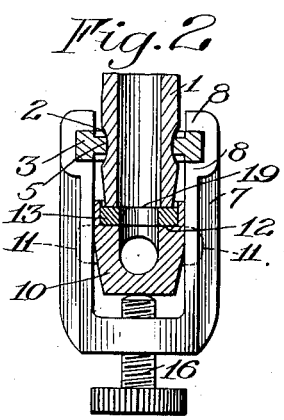
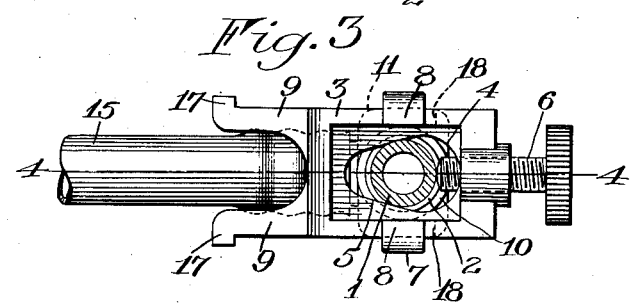
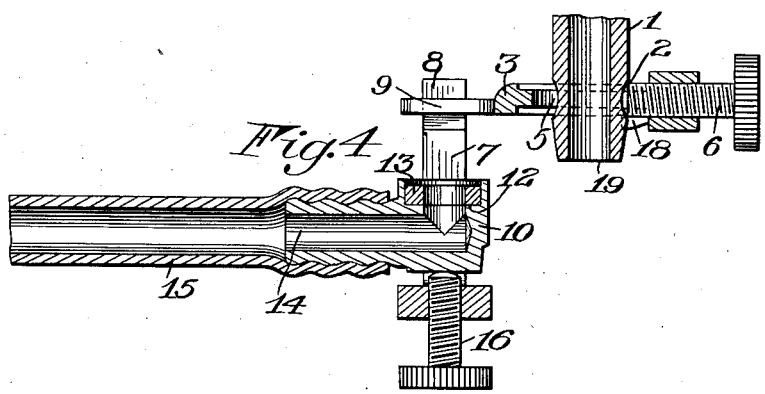
Inventor
Frederich O. Hilfiker
Witnesses
Walter B. Payne
Russell B. Griffith
By Church & Rich
his Attorneys

UNITED STATES PATENT OFFICE.

FREDERICK O. HILFIKER, OF ROCHESTER, NEW YORK, ASSIGNOR TO F. O. HILFIKER CO., OF SYRACUSE, NEW YORK, A CORPORATION OF NEW YORK.

FAUCET ATTACHMENT.

1,112,065.     Specification of Letters Patent.     Patented Sept. 29, 1914.

Application filed June 17, 1911. Serial No. 633,887.

*To all whom it may concern:*

Be it known that I, FREDERICK O. HILFIKER, of Rochester, in the county of Monroe and State of New York, have invented certain new and useful Improvements in Faucet Attachments; and I do hereby declare the following to be a full, clear, and exact description of the same, reference being had to the accompanying drawings, forming a part of the specification, and to the reference-numerals marked thereon.

My present invention relates to faucets, and has for its object to provide a simple, inexpensive and convenient attachment for a faucet for the purpose of joining a hose pipe or similar connection thereto, the improvements being directed in part toward promoting ease of attachment to and removal from the faucet and toward providing a strong, tight joint, well able to withstand any usual water pressure. A further object of the invention is to so construct the device that when it is desired to draw directly from the faucet instead of through the hose pipe, or other conducting member, the latter may be quickly and easily disconnected therefrom without, however, necessarily becoming detached, and the invention as a whole is adapted to render more convenient the attachment of the ordinary bath spray to a combination or other faucet, which it is desired at times to use in another way. To these and other ends the invention consists in certain improvements and combinations of parts all as will be hereinafter more fully described, the novel features being pointed out in the claims at the end of the specification.

In the drawings: Figure 1 is a front elevation of a hose connection constructed in accordance with, and illustrating one embodiment of my invention; Fig. 2 is a section thereof, taken substantially on the line 2—2 of Fig. 1; Fig. 3 is a section, taken substantially on the line 3—3 of Fig. 1, and Fig. 4 is a section, taken substantially on the line 4—4 of Fig. 3, but showing the hose pipe disconnected temporarily from the source of supply.

Referring more particularly to the drawing, the nozzle portion 1, only, of a familiar type of faucet is illustrated, the same being provided preferably and usually with an annular groove 2 near its mouth. In the practice of my invention, as shown in the present embodiment, I provide a bracket plate 3 having an opening 4 to receive the nozzle 1, said opening being formed with a reduced portion 5 into which the nozzle is forced and tightly clamped by suitable means, such as a set screw 6, preferably arranged at one end of the plate on one side of the opening 4.

Slidable laterally on the bracket plate is a preferably yoke-shaped hanger or carrier 7, the outer ends of the arms of which are provided with lugs 8 that coöperate with the edges of the plate 3 as a guide, and with the edges of a guiding extension 9 on the plate projecting from the opposite side of the aperture 4 from that on which is located the set screw 6. A conducting member 10 is arranged between the arms of the yoke of the carrier 7 to slide, in the present instance, vertically thereon as a guide, or at least in a direction transverse to the path of movement of the carrier on the bracket plate, for which purpose it is preferably provided with lugs 11. In the present instance, this conducting member is in the form of an elbow, one extension of which is provided with a seat 12 preferably fitted with a soft rubber or other suitable gasket 13, while the other, 14, is suitably formed to receive and retain the expanded end of the hose pipe 15. A set screw 16, or other suitable means, is provided to force the seat 13 of the elbow in the direction of the bracket plate and nozzle, and in the present instance this set screw is threaded into the base of the yoke-shaped carrier 7 to engage beneath the elbow in alinement with the seat 13.

The bracket plate 3 may be secured to the faucet nozzle 1 in the manner above described, and may be maintained there practically at all times. When it is desired to use the faucet in its ordinary capacity, the carrier 7 is moved out on the extension 9 of the bracket, as shown in Fig. 4, lugs 17 being provided on the latter to prevent it from becoming detached, in which position the conducting member or elbow 10 is offset from the faucet as is the carrier, hose pipe and in fact all the underhung and movable parts, so that the discharge from the nozzle is not intercepted by them or interfered with in any manner. In this position of the parts, the free end of the bath spray, when such is being used, carrying the hose or head may be hung up as usual, and here it will be noticed that the structure is such that nearly all the contents of the hose pipe is allowed to drain off. To subsequently connect up the hose to receive the discharge from the faucet, it is only necessary to slide the carrier 7 over until halted by lugs or other abutments 18 on the bracket 3, at which point the seat 12 of the conductor or elbow 10 is brought beneath and into alinement with the faucet nozzle. Then by tightening the set screw 16, that engages beneath the elbow, the latter is moved on the carrier until its seat firmly engages the mouth 19 of the nozzle as clearly shown in Fig. 2, and the spray is ready for use.

A device constructed in accordance with my invention possesses few parts nearly all of which may be readily cast and easily assembled, while it will be noted that one type of set screw may be made to perform the functions of both the elements 6 and 16. The depending yoke-shaped hanger 7 and the means for moving the elbow 10 along the same into engagement with the faucet possesses great strength, and cannot well be misused, while the great advantage of having the parts held together at all times with either use of the faucet, in contradistinction to a device in which separate parts have to be detached and subsequently applied with the chance of being misplaced between times, will be readily appreciated.

I claim as my invention:

1. In a hose connection for faucets, the combination with a bracket embodying a rigid guide and means for securing it to the faucet in a fixed position thereon, of a conducting member supported by the bracket and having a rectilinear movement on the guide relatively to the faucet into and out of alinement with the mouth of the latter, and means for preventing disengagement of the conducting member from its guide when out of alinement with the faucet.

2. In a hose connection for faucets, the combination with a bracket and means for securing it to the faucet in a fixed position thereon, of a conducting member supported by the bracket and having a seat, said member being laterally adjustable on the bracket to bring its seat into and out of alinement with the mouth of the faucet and movable on the bracket with the contacting member, means independent of the supporting connection of the conducting member for clamping said seat against the mouth of the faucet.

3. In a hose connection for faucets, the combination with a bracket and means for securing it in fixed position to the faucet, of a carrier guided on the bracket, a conducting member guided on the carrier and having a seat, said member being movable laterally with the carrier to bring its seat into and out of register with the mouth of the faucet, and means for moving the conducting member on the carrier to engage the seat thereof with the mouth of the faucet.

4. In a hose connection for faucets, the combination with a bracket having an opening therein adapted to receive the mouth of the faucet and means for rigidly securing it on the latter, of a yoke-shaped carrier guided on the bracket, an elbow within the yoke provided with a seat and movable laterally with the carrier to bring the seat into and out of register with the faucet opening of the bracket, and also movable on the carrier in a direction transverse to the path of movement of the latter on the bracket, and means on the carrier for moving the elbow seat laterally thereof toward said opening.

5. In a hose connection for faucets, the combination with a bracket having an opening therein adapted to receive the mouth of a faucet and means for rigidly securing it on the latter, of a yoke-shaped carrier depending from and guided on the bracket, an elbow movable within the yoke provided with guiding lugs coöperating with the arms of the latter and with a seat, said elbow being movable laterally with the carrier to bring the seat into and out of register with the faucet opening of the bracket and also movable on the carrier in a direction transverse to the path of movement of the latter on the bracket, and a set screw threaded in the carrier and engaging beneath the elbow for moving the latter relatively to the carrier and forcing its seat toward the said opening.

6. In a hose connection for faucets, the combination with a bracket plate provided with an opening to receive the mouth of a faucet, of a yoke-shaped carrier depending therefrom and provided with lugs engaging the edges of the plate by means of which it is guided on the latter in a direction laterally of the faucet mouth, an elbow arranged within the yoke of the carrier and provided with lugs coöperating with the latter to guide it in its movements toward and from the opening in the bracket plate, said elbow being provided with a seat for coöperation with the faucet mouth and being movable with the carrier on the bracket to bring such seat into and out of register with the faucet mouth, and a set screw threaded into the base of the yoke and engaging beneath the elbow to force the seat thereon into engagement with the faucet mouth.

7. In a hose connection for faucets, the combination with a bracket plate having an opening therein to receive a faucet, said opening being formed with a restricted portion, of a set screw threaded into the plate on one side of the opening to force the faucet end into the restricted portion of the latter, the plate being provided with a guiding extension on the opposite side of the opening, and a conducting member supported by the bracket plate and movable thereon on the extension guide into and out of alinement with the mouth of the faucet.

FREDERICK O. HILFIKER.

Witnesses:
RUSSELL B. GRIFFITH,
H. E. STONEBRAKER.